United States Patent [19]

Lowenthal, Jr.

[11] 3,906,655

[45] Sept. 23, 1975

[54] TRAP AND CAGE FOR AQUATIC ANIMALS

[75] Inventor: Walter S. Lowenthal, Jr., Freeport, N.Y.

[73] Assignee: Aberdeen Industries, Inc., Bay Shore, N.Y.

[22] Filed: June 19, 1974

[21] Appl. No.: 480,632

[52] U.S. Cl. .................................. 43/100; 43/105
[51] Int. Cl. ............................................ A01k 69/08
[58] Field of Search ................ 43/100, 103, 105, 65

[56] References Cited
UNITED STATES PATENTS

| | | | |
|---|---|---|---|
| 2,123,471 | 7/1938 | Lewis | 43/100 |
| 2,536,281 | 1/1951 | Hamel | 43/105 |
| 2,731,761 | 1/1956 | Marshall | 43/100 |

*Primary Examiner*—Hugh R. Chamblee
*Attorney, Agent, or Firm*—Darby & Darby

[57] ABSTRACT

A trap for catching crabs, or other similar aquatic animals, and a cage for holding the same made of substantially all plastic material and including a bait holder, the trap being readily assembled from or disassembled into a relatively small package of its component parts.

12 Claims, 8 Drawing Figures

TRAP AND CAGE FOR AQUATIC ANIMALS

Traps for catching aquatic animals, such as crabs are well known in the art. In particular, a prior art trap is the so-called Chesapeake-Bay crab trap which is made of wire mesh. The trap includes a pair of entranceways on opposite sides through which the crab can enter the trap. The crab falls from the end of the entranceway into the main body of the cage and is prevented from swimming out therefrom by various shapeguards and projections.

The prior art Chesapeake Bay traps have several disadvantages. First of all, they are made of metal and, therefore, are susceptible of rusting after a period of time. In addition, it is extremely difficult, if not entirely impossible, to "knockdown" the trap either for shipping or transportation to and from the site where it is to be used. For example, a typical trap of this type measures about 16 inches × 16 inches × 16 inches. Therefore, only a very few of these traps can be carried by a sport trapper in his car or boat. The size of the prior art traps also limits their use by commercial trappers. As a further disadvantage of the prior art trap, the insertion or replacement of bait is inconvenient.

The present invention relates to a crab trap which is preferably made of all plastic material and is, therefore, substantionally impervious to rust. In addition, a novel interlocking construction of the various pieces of the trap is utilized such that the trap can be knocked down to a relatively small size. In a typical embodiment of the invention, wherein the open fully assembled version of the trap is approximately 16 inches × 16 inches × 16 inches, the trap can be knocked down into a package of about 16 × 16 × 3 inches high. This permits approximately five times more traps to be transported or stored in the same space as compared to the prior art traps. In addition, the trap of the subject invention can be readily assembled and disassembled from its various pieces.

It is therefore an object of the present invention to provide a novel crab trap which is capable of being disassembled into its component parts into a relatively flat package and readily reassembled.

A further object is to provide a crab trap made of interlocking plastic members.

A still additional object is to provide a crab trap of substantially all plastic material including a bait compartment therein.

Other objects and advantages of the present invention will become more apparent upon reference to the following drawings and annexed specification in which.

GENERAL DESCRIPTION OF THE INVENTION

The overall construction of the trap is described generally with respect to FIGS. 1–3 and the details of the various trap compartments are described in detail below.

In general, unless otherwise noted, all of the trap compartments are injection molded of a suitable plastic material which is relatively rugged and can withstand salt water. The preferred material is talc-filled polypropylene. This material is durable and it also will sink in water.

Figure 1:
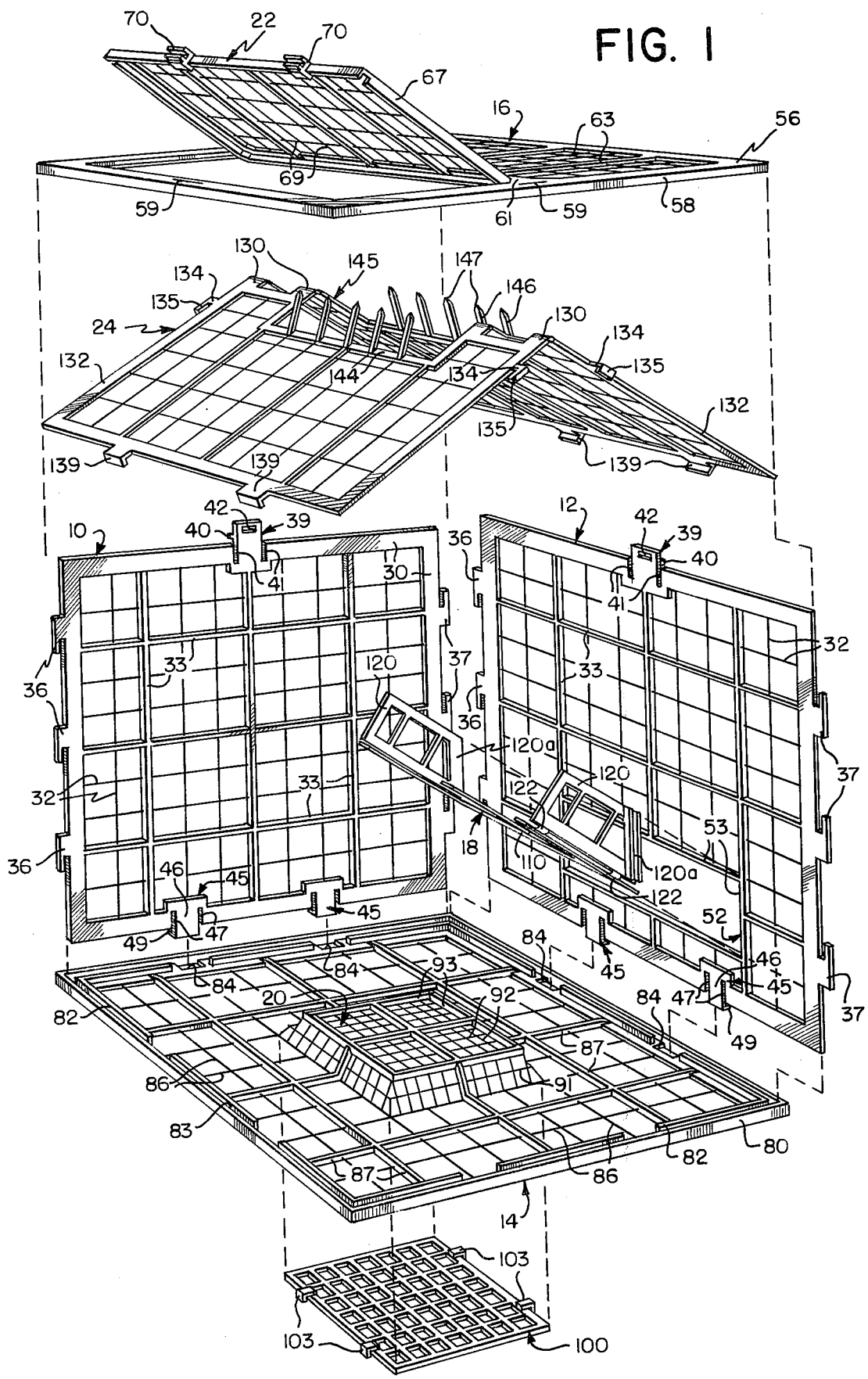
FIG. 1 is an exploded perspective view of a portion of the crab trap according to the present invention.
Figure 2:
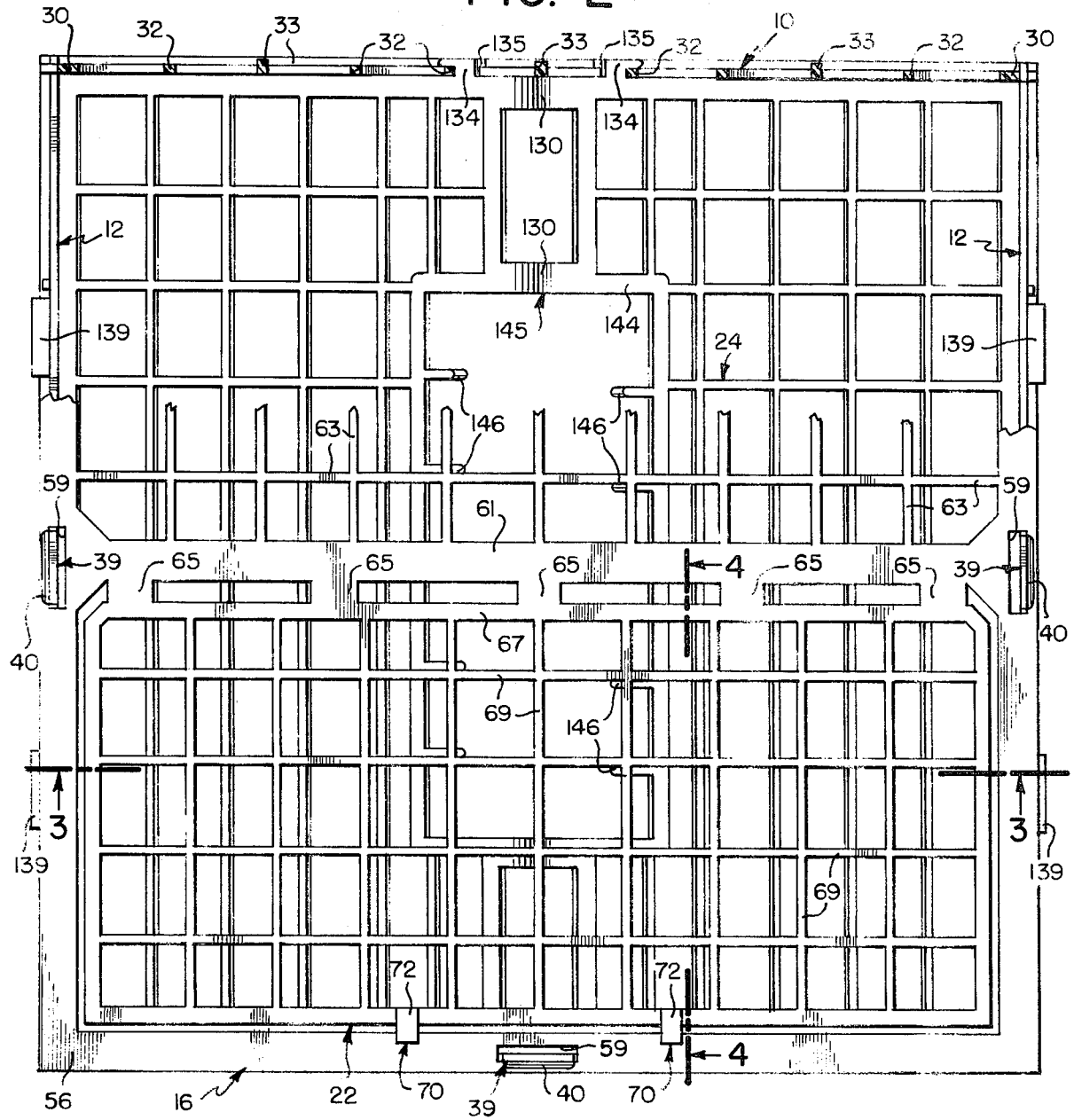
FIG. 2 is a top plan view showing the trap fully assembled and with various pieces broken away.
Figure 3:
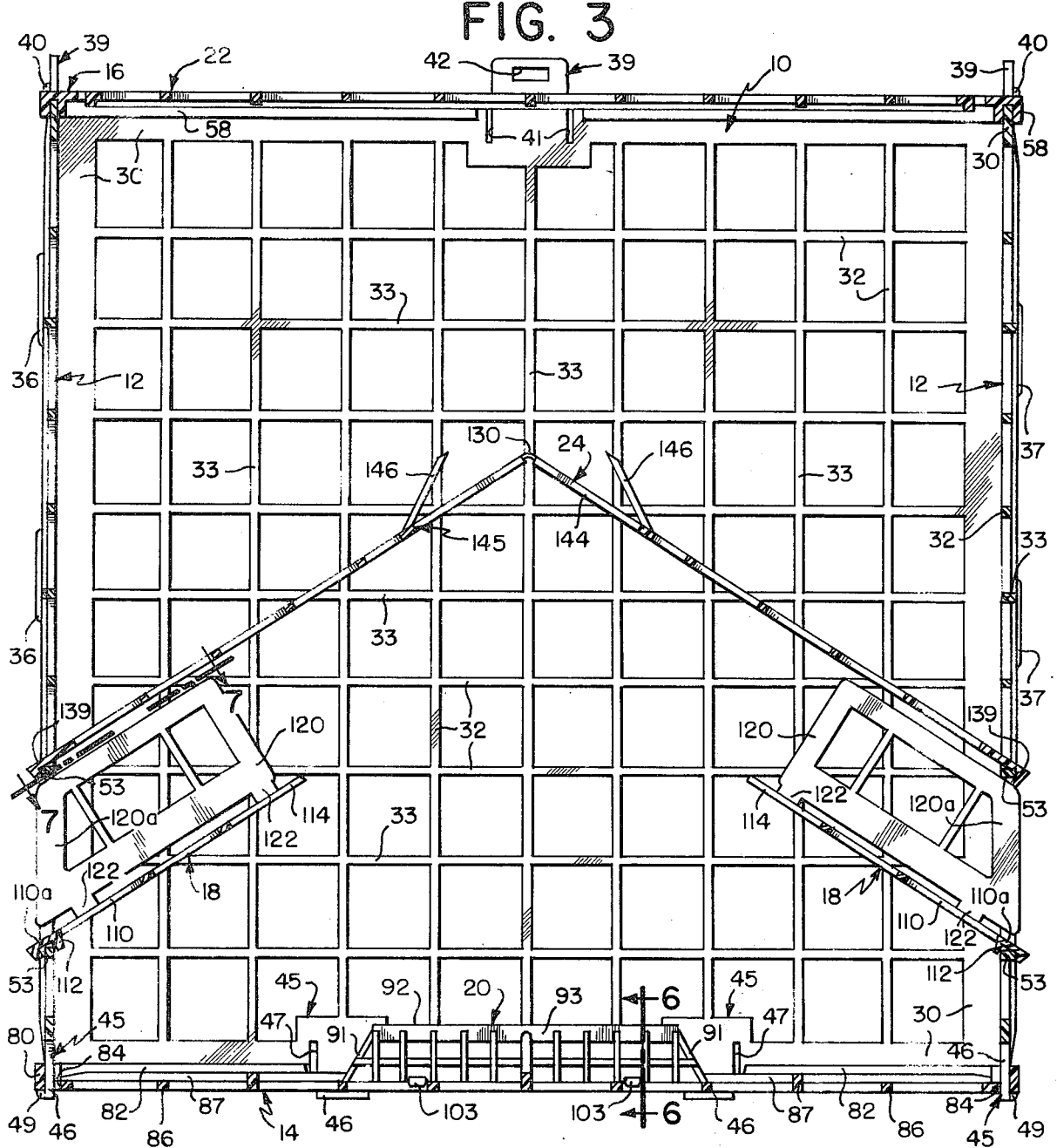
FIG. 3 is a cross-sectional view in elevation looking in the direction along lines of 3—3 of FIG. 2.

Referring to FIGS. 1–3, the trap of the present invention is a generally cubical structure having a pair of a first type of opposing side walls 10 and a pair of a second type of sidewall 12. A bottom wall 14 and a top wall 16 are attached to the side walls 10, 12. Each of the pair of side walls 12 supports a walkway 18 while a bait holder 20 is located in the bottom wall. The top wall 16 includes a door 22 through which a trapped crab can be extracted. A generally gable shaped guard member 24 is located above the walkway 18 and is held between the two side walls 12.

The various components are described individually below.

Side Wall 10

Each of the pair of side walls 10 is identical and, therefore, only one is described. The side wall 10 is of generally square shape and includes an outer frame member 30 having a grid of bars 32 extending thereacross. Selected ones 33 of said bars are of somewhat heavier construction to impart a greater degree of rigidity to the side wall 10.

Generally L-shaped lock members 36 and 37 are formed on the vertical rails of the frame 30. Reference numeral 36 is used to indicate lock members whose openings and fingers extend downwardly (as seen on the left side of wall 10 in FIG. 1) while reference numeral 37 indicates lock members whose openings and fringes extend upwardly.

A latch 39 is formed on the upper horizontal rail of the frame 30. The latch includes an outwardly extending tab 40 and an opening 42 formed above the tab. A slit 41 extending downwardly into a portion of the rail 30 on each side of the latch permits it to be more readily moved in and out of the plane of the wall.

A pair of latch members 45 are also formed on the bottom horizontal rail of the frame 30. These include a strengthening portion 46 bridging a pair of slots 47 which permits the member 45 to be bent. Each latch 45 also has an outwardly extending tab 49 at the bottom thereof (see FIG. 3).

The other side wall 10 is of identical construction of the one described. Therefore, when the two side walls 10 face each other, one is turned 180° with respect to each other so that the two different types of locking members 36 and 37 are opposite each other.

Side Walls 12

Each of the side walls 12 is identical and of similar construction to the side walls 10. Therefore, the same reference numerals are used where applicable. The major difference between the side walls 10 and 12 is that the latter are provided with a generally rectangular opening 52 adjacent the bottom thereof which is bounded by the horizontal and vertical ribs 53. The purpose of the opening 52 is described below. Here again, each of the side walls 12 is of identical construction, so that when they are turned 180° with respect to each other, the positions of the locks 36 and 37 will be interchanged.

Top Wall 16

Figure 4:
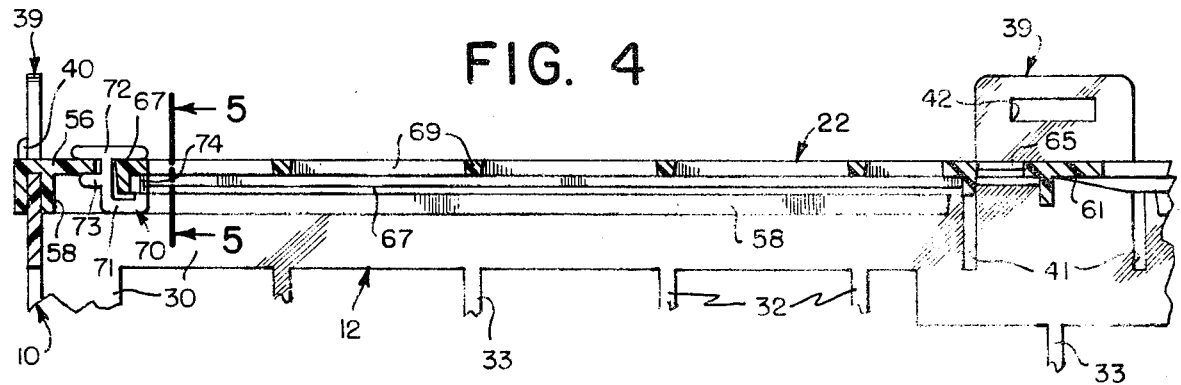
FIG. 4 is a fragmentary, cross-sectional, elevational view looking along the lines 4—4 of FIG. 2.

The top wall 16 includes a square frame member 56 which is formed with a U-shaped channel 58 on its bottom wall. This is shown in FIG. 4. An opening 59 is formed in the approximate center of each of the rails of frame 56 through which a respective latch member 39 of a wall 10 or 12 can pass.

Figure 5:
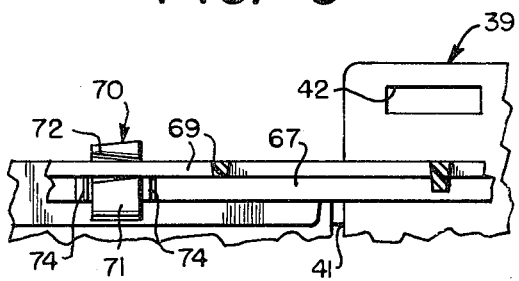
FIG. 5 is a fragmentary elevation view of the door and hinge looking along lines 5—5 of FIG. 4.

The top 16 is divided by a crosspiece 61 into two sections (see FIG. 2). The first section includes a plurality of bars 63 forming a grid. A plurality of hinges 65 extend from the cross-piece 61. The hinges 65 are integrally formed with the cross-piece 61 and are of relatively thin material. The generally rectangular door 22 having an outer frame 67 is attached to the hinges 65 and can bend thereon to an open or a closed position. As seen in FIGS. 4-5, the frame 67 is generally L-shaped. The door 22 is also formed by a grid of bars 69 and its general outer shape forms to the remaining half of the top wall 16.

A pair of locking clips 70 are clipped onto the long rail 67 of the door closest to the top wall frame 56. The locking clips are preferably formed from an elongated extruded member and cut to size. Each clip 70 includes (FIG. 4) an inverted C-shaped piece 71, a flat top piece 72 and a channel piece 73 connected to one of the legs of the piece 71 defining a channel between the two pieces 72 and 73. Each locking clip 70 is clipped between two ribs 74 formed on the underside of door frame 67 (FIG. 5). The channel formed between the two pieces 72 and 73 of each locking clip 70 can be locked onto the flat portion of the top wall frame 56. The top frame 56 and door frame 67 have sufficient resiliency so that the door can be bent to unseat the locking clips 70.

Bottom 14

The bottom 14 (FIGS. 1, 2, 3 and 6) has a square frame 80 formed by an L-shaped piece with a spaced inner piece 82 substantially therearound so as to form a channel 83 therebetween. This is shown best in FIG. 1. The width of the channel is sufficient to accommodate the bottom rail of the frame 30 of each of the side walls 10 and 12. Two openings 84 are formed on each rail of the frame 80 and each are of a size sufficient to accommodate one latch member 45 from the bottom rail of each side wall 10 and 12. A grid of bars 86 is formed across the bottom wall and includes bars 87 of somewhat large size to serve as strengthening members.

Figure 6:
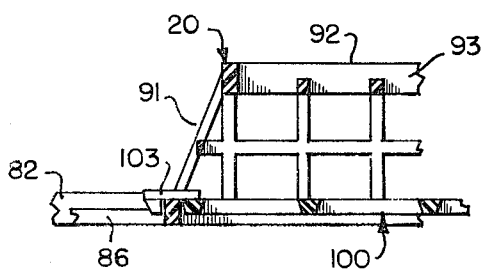
FIG. 6 is a fragmentary cross-sectional view of the bait compartment, taken along lines 6—6 of FIG. 3.

The bait housing 20 located on the bottom wall 14 has upwardly sloping side walls 91 closed off by a top wall 92. The walls 91 and 92 have bars forming a grid and the top wall includes strengthening pieces 93. The raised housing 20 is open in its interior and has an open bottom which is covered by a trap door 100 framed by a grid of bars. A pair of L-shaped latches 103 are formed on two opposing sides of door 100 with the short leg of the L extending downwardly. As seen in FIGS. 3 and 6, each latch 103 extends through the space between two of the bars of a side wall 100 and latches over one of the bars 86 of the bottom 14. By suitably manipulating the door 100, which is flexible due to its configuration, the door can be readily removed (see FIG. 6).

Walkways

Figure 7:
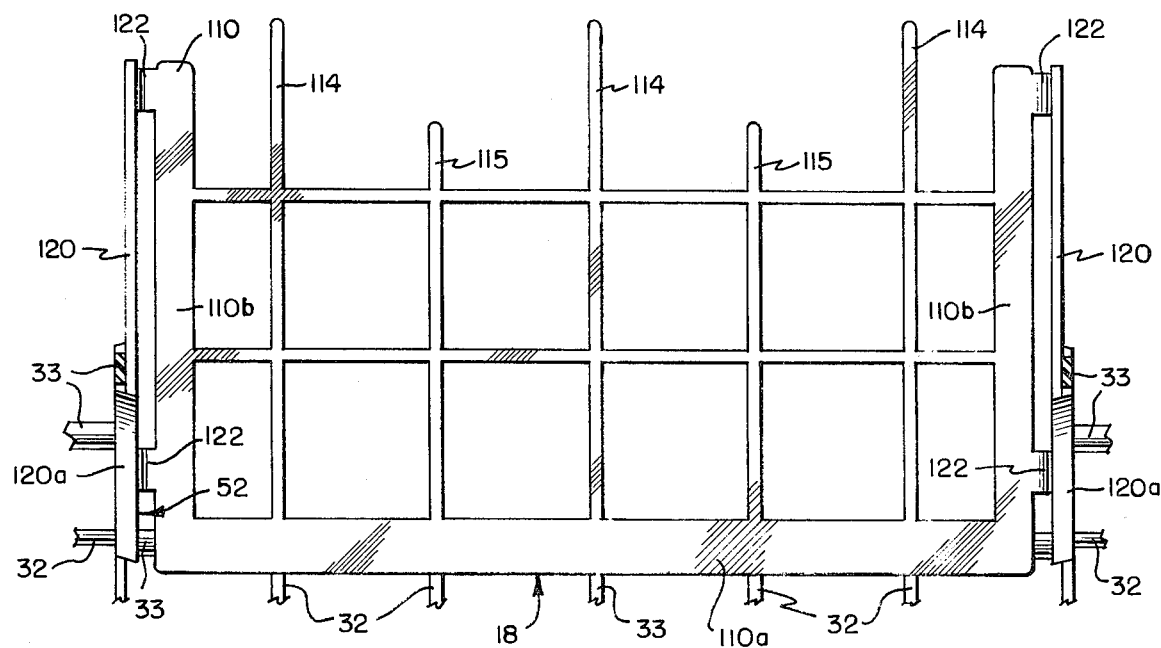
FIG. 7 is a plan view taken along the lines 7—7 of FIG. 3, and showing one of the walkways.

The walkways 18 are best described with reference to FIGS. 1, 3 and 7. Each walkway 18 includes a bottom platform 110 having a front rail 110a and side rails 110b. The underside of the front rail 110a is formed with a channel member 112 (see FIG. 3) to fit over the bottom bar 53 surrounding the opening 52 in the side wall 12. As seen in FIG. 7, there are a plurality of elongated pieces 114 and 115 extending in the direction of the side rails 110b, with pieces 114 being longer. The ends of these pieces 114 and 115 are preferably pointed or sharpened.

A guard member 120 is hingedly connected to each side of the platform 110 by hinges 122 which are thinned down extensions of the platform side rails 110b. The front rail 120a of the guard member (see FIG. 3) is formed at an angle so that when the guide member 120 is bent upwardly, rail 120a will extend substantially vertically. The front rail also has a channel shaped bottom piece which will snap over the vertical bar 53 surrounding opening 52.

Barrier

The barrier 24 is best seen with respect to FIGS. 1, 2 and 3. It is generally rectangular in shape having two similar sections which bend about a hinge formed by thinned down pieces 130. This permits the two sections to be bent into the gable shape shown.

The barrier 24 includes an outer frame member 132. A pair of L-shaped hooks 134 each having a downwardly extending leg 135 extend from opposite rails of the frame 132 for fitting over horizontal bars 32 on the side walls 10. On the two other rails of the frame 132, L-shaped hooks 139 are provided, whose arms extend parallel to the frame, to engage the bar 53 of the opening 52 in the wall 12.

A mullion 144 defines a generally rectangular opening 145 bridging the two sections of the barrier 24. A number of upwardly extending prongs 146 having pointed ends 147 extend from opposing sides of the mullion surrounding the opening 145.

Assembly

As should be apparent, all of the various pieces 10, 12, 14, 16, 18 are intended to be disassembled so that they can be laid flat or stacked on top of each other. Therefore, the total thickness of the complete package is the thickness of all of the various pieces laid one on top of the other.

Figure 8:
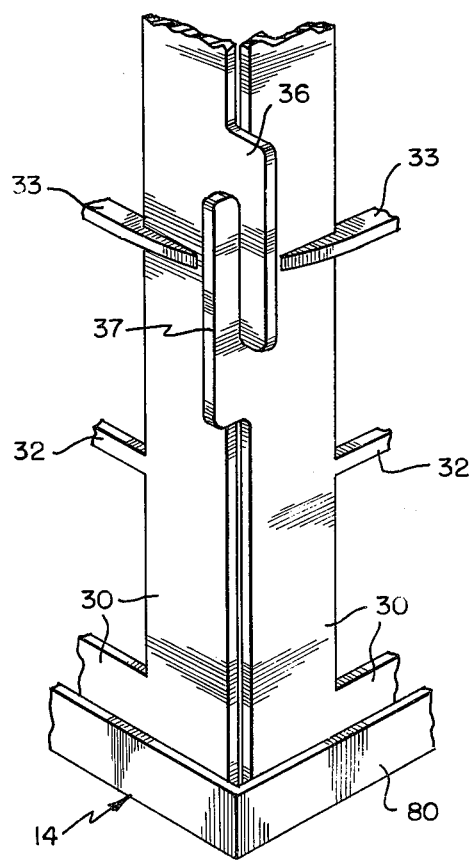
FIG. 8 is a perspective view showing the corner hinge construction for the side walls.

When it is desired to assemble the trap, a typical procedure is as follows:

1. The tabs 45 of a wall 10 or 12 are pushed through the corresponding openings 84 in the bottom 14, with a wall being in the channel 83, so that the latches 49 engage the bottom of the rail 80. Consider that this is the wall 10 shown in FIG. 1. Wall 12 shown in FIG. 1 would next be inserted into the bottom in the same manner. However, as illustrated in FIG. 8, the hinges 36 and 37 would be interlocked. The remaining two walls 10 and 12 are also assembled to the bottom in the same way and the respective hinges 36 and 37 are interlocked. The bottom and the side walls are now assembled.

2. The next step is to insert the walkways 18. This is accomplished by snapping the channel 112 of the platofrm 110 front rail 110a over the horizontal rail 53 defining the opening 52. The channels on the back of the angled rails 120a of the guard rails 120 are snapped over the vertical rails 53 surrounding opening 52. In this manner, the walkways 18 are locked to the final position shown in FIG. 3.

3. The barrier 24 is inserted through the open top. The L-shaped hooks 135 are snapped into the bars 32 on the opposing side walls 10. The L-shaped latch members 139 (see FIG. 3) are snapped over the top horizontal rails 53 of the openings 52. The two sections of the barrier 24 bend around hinges 130 and automatically assume the desired acute angle therebetween.

4. The top is then assembled by placing the top rails of the frame 30 of each of the walls 10 and 12 into the channel defined by members 57 and 57a on the frame 56. The latching tabs 39 project upwardly through the openings 59 in the frame 56. The latching tabs 39 snap outwardly so that the locks 40 engage the frame 56. The trap is now fully assembled. This can be done relatively quickly with a little practice. A fully assembled trap can be broken down into its component parts by reversing the assembly procedure.

Operation

After the trap is fully assembled, it is to be lowered into the water, usually attached to a cord or rope. The rope can be tied through the holes 42 in the latch members 39 or to any other part of the trap. Before placing the trap in the water, the bait housing trap door 100 is opened and bait placed in the housing 20. Door 100 is then snapped closed and the trap is lowered into the water. A crab traveling in the water senses the bait in housing 20. The only way to get to the bait is through the openings 52. A crab swimming or walking into an opening 52 travels up on walkway 18. Once it falls off of the platform 110 it is held in the area below the barrier 24. The crab cannot readily swim back out of the opening 52 since it is prevented from reaching it by the prongs 114 and 115. Similarly, it is difficult for the crab to swim through the opening 145 of the barrier 24. If it does, it is prevented from returning to the lower portion of the trap by the prongs 146.

When the fisherman retrieves his trap, it is only necessary to open the door 22 in the top 16 to retrieve the trapped crab. The fisherman reaches through the opening 145 in the barrier 24 to catch the crab and he can turn the crab sideways to pull him through the opening 145 and up out of the trap through the door 22.

The preferred embodiment of the trap disclosed herein is of entirely all plastic construction. Therefore, it is quite rugged and resistant to corrosion. It has been found that marine plant life, such as barnacles, do not readily cling to the plastic or, if it does, then it can be washed off quite readily. As also pointed out above, the trap can be broken down into a relatively flat package for transportation and it can be easily assembled and disassembled. When assembled, it provides a firm structure for holding the trapped crabs therein.

What is claimed is:

1. A trap of substantially all plastic material for acquatic animals comprising:

a pair of first side walls, at least one latching member formed on the top and the bottom and at least one locking means formed on each side of each said first side wall, a pair of second side walls each having an opening formed therein, at least one latching member formed on the top and the bottom of each said second side wall and at least one locking means formed on each side of each said second side wall for cooperating and locking with a said locking means of a said first side wall, a top, a hinged door on said top, means formed on each side of said top for mating and holding a corresponding latching member on the top of a respective one of each of said first and said second side walls, a bottom including a raised housing formed on a portion thereof, said housing having an open end, trap door means for closing said open end of said raised housing, cooperating means on said bottom and said trap door means for holding said trap door to said bottom, means formed on each side of said bottom for mating and holding a corresponding latching member on the bottom of a respective one of each of said first and second side walls, a pair of walkways, mating means on each of said walkways and each of said second side walls for holding a said walkway to a said second side wall, and barrier means for location within the space defined by said pairs of first and second side walls when the latter are connected together, said barrier means including a central opening, and means on said barrier means for engaging at least two of said side walls to hold the barrier means within said space located between said bottom and said top.

2. A trap as in claim 1 wherein said bottom is formed with an upwardly extending lip substantially theraround within which the bottom of each of said side walls is located when the trap is assembled.

3. A trap as in claim 1 wherein said top is formed with a downwardly extending lip substantially therearound within which the top of each of said side walls is located when the trap is assembled.

4. A trap as in claim 1 wherein the latching member on the top and bottom of each of said side walls comprises an extending piece having a latching tab projecting outwardly therefrom, said means on each of said top and bottom for cooperating with the latching members comprising an opening through which a said extending piece projects, the latching tab on a said extending piece engaging the corresponding portion of the top and bottom adjacent a said opening.

5. A trap as in claim 1 wherein each said walkway is integrally formed within a central platform and a hinged guard member extending from each side thereof, means on each said guard member for attaching it to a portion of a said second wall.

6. A trap as in claim 5 wherein an edge of each said guard member is angled so as to extend generally vertically when folded upwardly from said central platform and attached to a said second wall.

7. A trap as in claim 5 wherein said attaching means on said walkway comprises a channel member adapted to fit onto a portion of a said second side wall surrounding a said opening.

8. A trap as in claim 6 wherein said attaching means on said walkway and its guard member comprises a channel member adapted to fit onto a corresponding portion of a said second side wall surrounding a said opening.

9. A trap as in claim 1 wherein said barrier means comprises a single piece integrally formed with hinge means at the center thereof about which said piece is bent to form said barrier means into a gable shaped structure, said opening of said barrier means spanning across the center of said piece.

10. A trap as in claim 9 further comprising a plurality of members projecting outwardly from said barrier means adjacent said opening.

11. A trap as in claim 9 wherein said means on the barrier for engaging said side walls comprises hook members integrally formed with said barrier.

12. A trap as in calim 1 wherein said locking means on the sides of each of said first and second side walls comprises generally L-shaped members extending in opposite directions at the juncture of a said first and a said second side wall to permit the two walls to be locked together by placing said locking members one within the other.

* * * * *